United States Patent
Song et al.

(10) Patent No.: US 10,579,430 B2
(45) Date of Patent: Mar. 3, 2020

(54) DYNAMIC, LOAD BALANCED TASK ROUTING

(71) Applicant: Microsoft Technology Licensing, LLC, Redmond, WA (US)

(72) Inventors: Xinying Song, Bellevue, WA (US); Jaideep Sarkar, Redmond, WA (US); Karan Srivastava, Seattle, WA (US); Jianfeng Gao, Woodinville, WA (US); Prabhdeep Singh, Newcastle, WA (US); Hui Su, Bellevue, WA (US); Jinchao Li, Redmond, WA (US); Andreea Bianca Spataru, Seattle, WA (US)

(73) Assignee: Microsoft Technolog Licensing, LLC, Redmond, WA (US)

( * ) Notice: Subject to any disclaimer, the term of this patent is extended or adjusted under 35 U.S.C. 154(b) by 92 days.

(21) Appl. No.: 15/972,968

(22) Filed: May 7, 2018

(65) Prior Publication Data
US 2019/0340030 A1 Nov. 7, 2019

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 7,047,206 B1 | 5/2006 | Schultze | |
| 8,326,663 B2 | 12/2012 | Christon et al. | |
| 9,785,956 B2 | 10/2017 | van der Laan et al. | |
| 2009/0192918 A1 | 7/2009 | Hood et al. | |
| 2014/0149178 A1 | 5/2014 | Hedges | |
| 2016/0071134 A1 | 3/2016 | Duncan | |

FOREIGN PATENT DOCUMENTS

EP 2680231 A1 1/2014

OTHER PUBLICATIONS

"When Is the Right Time to Pass a Lead to Sales?", Retrieved From https://web.archive.org/web/20180205222532/https:/www.salesfusion.com/resource/when-is-the-right-time-to-pass-a-lead-to-sales/, Feb. 5, 2018, 5 Pages.

(Continued)

*Primary Examiner* — Gregory A Kessler
(74) *Attorney, Agent, or Firm* — Schwegman Lundberg & Woessner, P.A.

(57) ABSTRACT

Generally discussed herein are devices, systems, and methods for task routing. A method can include receiving, from a resource, a request for a task, in response to receiving the request, determining whether to retrieve a new task of new tasks stored in a first queue or a backlog task of backlog tasks stored in a second queue based on a combined amount of backlog tasks and new tasks relative to a capacity of the resource or the resources, retrieving the new task or the backlog task from the determined first queue or second queue, respectively, based on the determination, and providing the retrieved task to the resource.

20 Claims, 3 Drawing Sheets

(56) References Cited

OTHER PUBLICATIONS

Rothman, Dayna, "The Key to Sales and Marketing Alignment: The Sales Development Rep", Retrieved From https://web.archive.org/web/20140724230149/https:/blog.marketo.com/2013/01/the-key-to-sales-and-marketing-alignment-the-sales-development-rep.html, Jan. 18, 2013, 6 Pages.

Li, Jinchao, et al., "Resource Scheduling Using Machine Learning", U.S. Appl. No. 15/943,206, filed Apr. 2, 2018, 38 Pages.

Campos, et al., "A Real-time Expert System Architecture Based on a Novel Dynamic Task Scheduling Technique", In Proceedings of IEEE 28th Annual Conference of the Industrial Electronics Society, Nov. 5, 2002, pp. 1893-1898.

"International Search Report and Written Opinion Issued in PCT Application No. PCT/US19/029758", dated Jul. 24, 2019, 12 Pages.

Spuri, et al., "Robust Aperiodic Scheduling Under Dynamic Priority Systems", In Proceedings 16th IEEE Real-Time Systems Symposium, Dec. 5, 1995, 10 Pages.

DYNAMIC, LOAD BALANCED TASK ROUTING

BACKGROUND

Task routing is a challenging task that includes tradeoffs. For example, a resource routed a task at time A, is not available to perform a different task at the same time. In another example, the time it takes for a resource to perform a task can limit a number of tasks fulfilled by the resource. Consider a resource that takes six minutes to perform a task, it cannot perform a task at a first time and a second task at five minutes after the first time, because it will not be available for another minute. Thus, the resource will not be available when a new, more important task is to be allocated three minutes after the first task is routed to the resource. Further yet, resources can be scarce and the number of tasks to be performed can be more than the scarce resources can handle. The resources can be insufficient to complete tasks to be performed in such circumstances, creating a task backlog, and thus some prioritization of backlog tasks and new tasks can help alleviate some of these problems.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A task management system can include a first queue to store new tasks for completion by a resource of resources, a second queue to store backlog tasks previously attempted, unsuccessfully, by the resource of the resources, processing circuitry coupled to the first and second queues, the processing circuitry to receive, from the resource, a request for a task, in response to receiving the request, determine whether to retrieve a new task of the new tasks or a backlog task of the backlog tasks based on a combined amount of backlog tasks and new tasks relative to a capacity of the resource or the resources, retrieve the new task or the backlog task from the determined first queue or second queue, respectively, based on the determination, and provide the retrieved task to the resource.

A non-transitory machine-readable medium including instructions that, when executed by a machine, configure the machine to perform operations comprising receiving, from a resource, a request for a task, in response to receiving the request, determining whether to retrieve a new task of new tasks stored in a first queue or a backlog task of backlog tasks stored in a second queue based on a combined amount of backlog tasks and new tasks relative to a capacity of the resource or the resources, retrieving the new task or the backlog task from the determined first queue or second queue, respectively, based on the determination, and providing the retrieved task to the resource.

A method of task management can include receiving, from a resource, a request for a task, in response to receiving the request, determining whether to retrieve a new task of new tasks stored in a first queue or a backlog task of backlog tasks stored in a second queue based on a combined amount of backlog tasks and new tasks relative to a capacity of the resource or the resources, retrieving the new task or the backlog task from the determined first queue or second queue, respectively, based on the determination, and providing the retrieved task to the resource.

DETAILED DESCRIPTION

Figure 1:
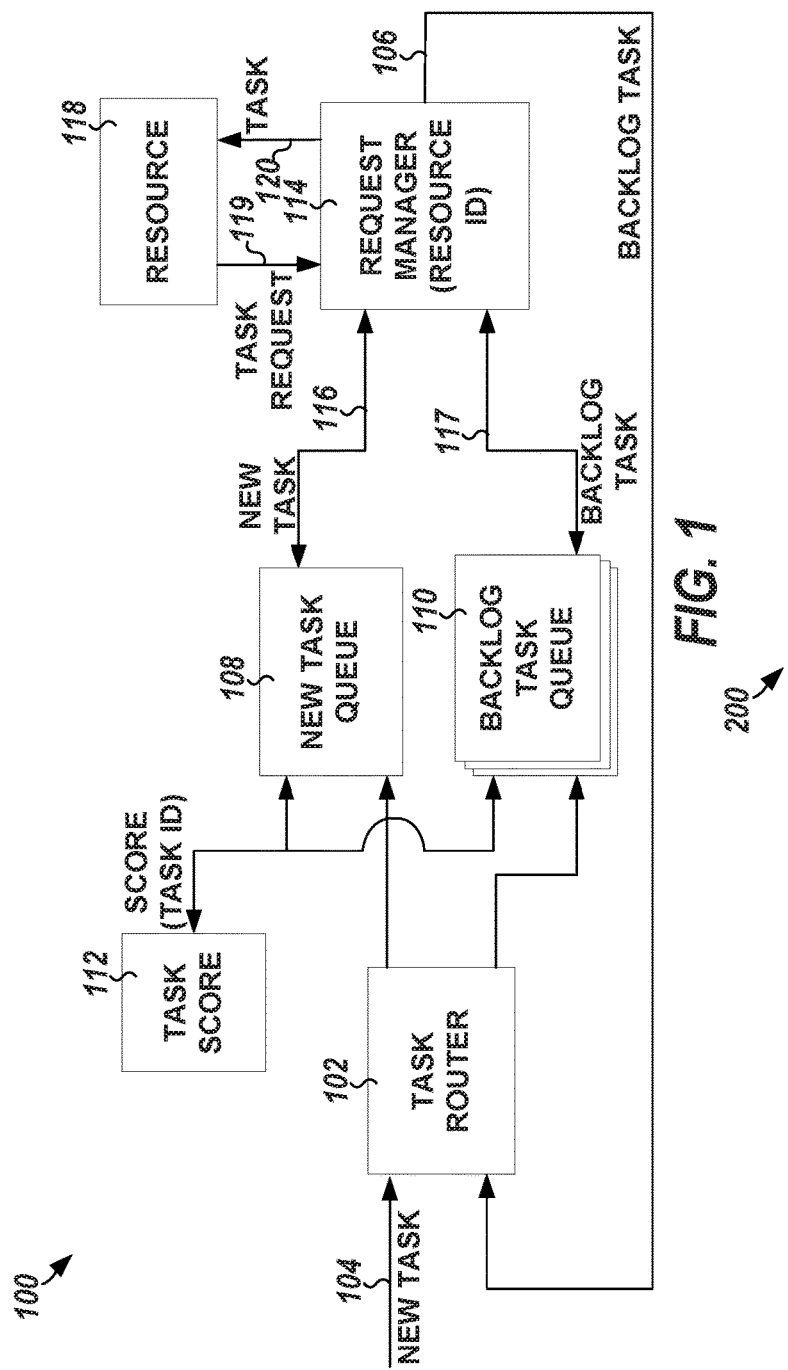
FIG. 1 illustrates, by way of example, a diagram of a system for routing a task (e.g., a new task, or backlog task) to a resource.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

A problem for computer-implemented scheduling and task routing, beyond those previously discussed in the BACKGROUND, includes a lack of ability to adjust the schedule or task allocation in real time, near real time, or the like. Computer-implemented schedulers often do not have flexible enough routing to adapt to a changed schedule. Schedules are often created and then implemented some time later, giving the routing scheme some time to adapt.

Schedules often govern resource allocation and task performance for a period of time after deployment of the schedule. These lag times between creation and implementation fail to account for changes in priority of a resource or a priority of a task that has changed, or some unforeseen circumstance between the creation of the schedule and the routing of the schedule. Thus, these prior schedule and task routing systems result in a non-optimal resource allocation or non-optimal task management.

Some tasks are time-sensitive, such that completion of the task is more likely successful if performed within a time window and less likely successful is performed outside the time window. There are occasions in which the time window or likelihood of success is only known after schedule deployment. Schedulers and task routers that do not account for this time dependency can cause the schedule and task routing to be less optimal than a schedule that accounts for the time dependency.

To overcome these tradeoffs, some schedulers prioritize tasks and/or resources with static priority values. Tasks with higher priority are placed on the schedule before tasks with lower priority. Resources with higher priority can be scheduled to perform higher priority tasks than resources with lower priority. These schedules fail to account for the time-of-day-sensitivity mentioned previously and to account for changing resource availability and increased knowledge regarding the task or the resource.

Task routing and management suffers similarly, in that the best task to route is determined based on the schedule. If the schedule is not current or not yet deployed, the routed task can be sub-optimal.

Another problem with task routing is determining whether to perform a backlog task or a new task. A backlog task is one that was scheduled previously but was not completed or a task that was scheduled and causes another task to be performed to complete the task. Systems can prioritize new tasks over backlog tasks or vice versa. Some systems will not be able to keep up with the number of scheduled tasks, so the back log will continue to grow. Some systems will increase an amount of resources available to perform the tasks to help control the backlog.

Embodiments herein can help reduce a backlog, such as without increasing the number of resources, and can help determine whether a backlog task or new task is to be performed. These embodiments can dynamically determine (e.g., in real time, near real time, or periodically), given a resource and the tasks to be performed, whether it is more beneficial to perform a backlog task or a new task. On the one hand, performing a backlog task can help reduce the backlog, but possibly at the expense of not performing one or more scheduled tasks. On the other hand, performing a new task can help satisfy a schedule, but possibly at the expense of not reducing a backlog.

Embodiments can consider an overall effect on a goal (e.g., of an individual resource or a pool of resources) and based on the determined effect, provide a backlog task or a new task to a resource. The task (e.g., backlog task or new task) can be provided in response to the resource requesting a task. The task can be scored dynamically, such as by using a machine learning model. The scoring can be performed using operations described in U.S. patent application Ser. No. 15/943,206 titled "Resource Scheduling Using Machine Learning" and filed on Apr. 2, 2018, the contents of which are incorporated by reference herein in their entirety.

Embodiments can include a backlog queue and a new task queue. The backlog queue can be partitioned or indexed by resource identification (ID) or there can be a backlog queue for each resource. The tasks in the backlog queue can be dedicated to performance by a resource that first attempted to complete the task. The tasks in each queue can be ordered based on the determined score. Thus, as a new task or uncompleted task is received at the queue, the tasks in the corresponding queue can be re-ordered (e.g., according to score). The tasks in the queue can be re-ordered periodically, such as can be based on a determined score that is time-dependent. That is, the score changes based on the time of day. This reflects that different tasks can be, more likely, completed at different times of day.

As previously discussed, embodiments herein can help overcome one or more of the problems of prior task routing systems. Embodiments herein can help schedule and deploy the time-sensitive tasks, such as by altering a priority of the tasks to increase the likelihood of success in accomplishing the task. Embodiments herein can employ a supervised machine learning technique, such as a gradient boost tree model, to update a priority of a task or a resource. The schedule can be updated based on the updated priority and task routing can be altered accordingly.

Reference will now be made to the FIGS. to describe more details regarding improved task routing systems, devices, methods, and machine-readable media.

FIG. 1 illustrates, by way of example, a diagram of a system 100 for routing a task (e.g., a new task 116, or backlog task 117) to a resource 118. The system 100 can help balance a load on the resource 118, such as to help reduce a backlog, complete more tasks, or complete more, higher quality tasks than prior task routing systems. The system 100 as illustrated includes a task router 102, a new task queue 108, a backlog task queue 110, a task score circuitry 112, a request manager 114, and a resource 118 to perform a task. As used herein "task" means, generally, any task, either a backlog task or a new task. In describing the system 100, the term "task" is used when either a backlog task or a new task is used, the term "backlog task" means a task that was previously performed and not completed, and the term "new task" means a task that has not been attempted.

The task router 102 determines a task queue to receive a task. If the task is a new task 104, the task router 102 can route the task to a new task queue 108. If the task is a previously attempted task, a backlog task 106 (sometimes called a backlog task), the task can be routed to the backlog task queue 110. A new task 104 can be identified by a null, non-existent, or predefined resource identification value in a resource identification field 206 (see FIG. 2). Additionally, or alternatively, a new task 104 can be identified by a new task value of a new task field equaling a specified value.

Figure 2:
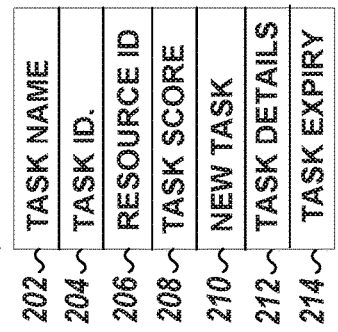
FIG. 2 illustrates, by way of example, a diagram of an embodiment of a task entry, such as can be stored in the new task queue or the backlog task queue of FIG. 1.

The tasks in the new task queue 108 can be sorted or indexed by score, task ID, or other task information (see FIG. 2). The new task queue 108 can be coupled to the task router 102, the task score circuitry 112, and the request manager 114. The tasks routed to the new task queue 108 can include a new task field 210 (see FIG. 2) that indicates the tasks have not been acted upon previously or can include a non-zero or other resource identification value in the resource identification field 206 (see FIG. 2) that is null, non-existent, or set to a predefined value (e.g., zero or all ones). A new task 104 generally does not include a resource ID field 206. The resource ID field 206 can be populated by the request manager 114, such in response to providing the new task to the resource 118 or in response to the resource 118 indicating that the task is uncompleted after the resource 118 attempts to perform the task.

The tasks in the backlog task queue 110 can be stored in different queues 110, different partitions of the same queue, or indexed base on a resource identification. The backlog task queue 110 can be distributed, such as to have a backlog queue for each resource 118 or partitioned, such as to have a partition for each resource 118. The backlog task queue 110 can include entries sorted by task ID, resource ID, score, or other task data (see FIG. 2).

A relative rate of task completion for the resource 118 and combined rate of receipt of (a) non-completion of the tasks and (b) new task reception at the task router 102 determines whether tasks are accumulating (there is a surplus of tasks), breaking even (no surplus and no shortage of tasks), or at a shortage (there are fewer tasks to be completed than the resource 118 can complete in a given period of time). Usually, a surplus of tasks is a bigger problem than a shortage. After a surplus is established, and a rate of resource non-completion or new task completion does not change, the backlog (surplus) just increases. One way to manage the surplus is to employ more resources 118 to perform backlog tasks of the backlog and manage the surplus to a point of breaking even or having a shortage. In a context of managing leads for a product provider, however, such a solution can be detrimental.

The detriment can be from the resources 118 that are employed very unlikely to have rapport with the leads. The detriment can be from the resources being inexperienced with the product and lead conversion techniques. The non-familiarity of the resource 118 to the lead or product can prohibitively decrease a likelihood of converting the lead to an opportunity. Similarly, the inexperience with the product reduces a likelihood that the employed resource will convert the lead to a sale or other opportunity. Embodiments herein can help reduce the backlog, such as without employing additional resources for reducing the backlog.

The task score circuitry 112 can produce a score for a given task, whether the task is a new task 104, 116, or a backlog task 106 or 117. The task score circuitry 112 can implement a machine learning model that considers a time-dependent feature (e.g., a difference between a current time of day and a time of day the task is most likely to be completed) in determining the score of the task. The task score circuitry 112 can determine the score for each of the tasks in the new task queue 108 and the backlog task queue 110. The task score circuitry 112 can determine the score periodically, such as every minute, five minutes, ten minutes, fifteen minutes, twenty minutes, etc. or some time therebetween. The task score circuitry 112 can update a task score value of a task score field 208 (see FIG. 2) of an entry in the new task queue 108 or the backlog task queue 110.

The request manager 114 can retrieve a new task 116 from the new task queue 108 or a backlog task 117 from the backlog task queue 110. The backlog task 117 can be the same or different as the backlog task 106. A difference between the backlog task 117 and the backlog task 106 can include a score value of a score field (see FIG. 2), which can be updated by the score circuitry 112. The new task 116 can be the same or different as the new task 104. A difference between the new task 104 and the new task 116 can include a score value of a score field (see FIG. 2), which can be updated by the score circuitry 112.

The request manager 114 can receive a task request 119 from a resource 118. The task request 119 can be for a next task to be performed by the resource 118. The request manager 114 can respond to the request 119 with a task 120 to be attempted by the resource 118. The request manager 114 can determine whether to retrieve a task from the new task queue 108 or the backlog task queue 110. In making the determination, the request manager 114 can consider an amount of backlog and an amount of new tasks in the new task queue 108 relative to a total number of tasks to be completed. If there is a surplus, the request manager 114 can retrieve a task from the backlog task queue 110 that includes a resource ID value in a resource ID field 206 (see FIG. 2) that matches a resource ID of the task request 119.

In retrieving a task, the request manager 114 can employ a probabilistic approach, such as for load balancing between new tasks and backlog tasks being attempted. For example, consider a scenario in which there are 50 backlog tasks, 30 new tasks, and 10 resources to complete the tasks. Of the backlog tasks, 4 are dedicated to performance by a first resource of the ten resources. The request manager 114 can choose a new task with probability of 3/8 (i.e. total number of new tasks (30) divided by a total number of tasks to be completed (30+50)) or 3/7 (i.e. number of new tasks attributable to the resource (30/10=3) divided by a total number of tasks to be completed by the resource (3+4)).

To implement a probabilistic choice, a random number generator or similar functionality can be employed. The request manager 114 can generate a number, and if the number is below a threshold (defined by the probability, such that a number of values below the threshold equals the probability) the request manager 114 can retrieve a task from the new task queue 108, otherwise the request manager 114 can retrieve a task from the backlog task queue 110.

As previously discussed, in some embodiments, the backlog task queue 110 can be partitioned by resource ID, such that each resource 118 has a dedicated backlog queue partition. In other embodiments, the backlog task queue 110 can be partitioned into a specified number of partitions. The backlog for each resource 118 can be stored in a backlog queue partition to which a resource ID of the resource 118 that handled the task originally hashes, based on a hash function. A hash function can, based on the resource ID, produce a value of fixed size. In embodiments, the fixed size can accommodate the number of partitions. For example, for 16 partitions, the fixed size can be four bits or an integer value in the range [0, 15].

In making the determination as to which task to retrieve from the queue 108 or 110, the request manager 114 can consider a score. The request manager 114 can first determine from which to queue to retrieve a task, then can retrieve the task with the highest score or other task. The task 120 can be provided to the resource 118.

The resource 118 can include an entity to perform the task 120. There are a wide variety of resource types. Different resource types can perform different tasks. For example, a resource type can include a device, such as a sensor, a compute or other device, a user of a compute device, a vehicle (e.g., a land, air, or sea vehicle), a weapon, a transmitter, a receiver, or other entity. The resource 118 can communicate with the request manager 114 to provide an indication of whether the task 120 was completed or details of an attempt to complete the task 120. The details provided by the resource 118 can be stored in a task details field 212 (see FIG. 2).

In an embodiment in which the resource is a sales person and the tasks are leads, the details can include a duration of a call, a disposition of the call (e.g., whether a sale was made or not), a product associated with the call, whether a follow up call or contact is to happen, a date or time of the follow up call, or the like. The details can help bring the resource 118 up to speed on the state of the opportunity with the lead.

In an event that the resource 118 does not complete the task 120, the request manager 114 can update the task details field 212 (see FIG. 2) and forward the task as a backlog task 106 to the task router 102. The task router 102 can cause the backlog task 106 to be stored in a corresponding backlog task queue 110.

In determining which queue, of the new task queue 108 and the backlog task queue 110, from which to retrieve the task 120, the request manager 114 can consider a global backlog (a backlog across all resources) or an individual backlog (a backlog of only the resource that issued the task request 119).

To determine an amount of backlog (either individual or global backlog) the request manager 114 can consider a capacity of the resource 118. Capacity can include a number of definitions. A first definition of capacity can include a total number of tasks that can be completed by the resource 118 in a specified time period (e.g., one minute, five minutes, ten minutes, half hour, hour, a day, a week, a month, etc. or a time therebetween). In embodiments that use this definition of capacity, historical data can be used to determine the capacity of the resource 118. For example, if the resource 118 attempts 224 tasks in a fourteen day period (two full work weeks, or 80 hours), the capacity can be determined as 224 tasks/10 work days, or 22.4 tasks/work day.

Another definition of capacity can include a number of hours expected for the resource 118 to perform a task. Using this definition of capacity, the request manager 114 can use historical data to determine the expected number of hours. Either definition can be determined individually, globally, for like resources, or for a group of resources. For the example discussed, an hourly capacity for the resource 118 can be determined as 224 tasks/80 hours or 2.8 tasks/hour. To get a global average, the tasks/hour can be determined for each resource and averaged, or the like.

The request manager 114 can determine whether there is a surplus, shortage, or break even based on the determined capacity, the number of tasks in the new task queue 108, or the tasks in the backlog task queue 110. If the number of tasks is greater than the determined capacity, there is a surplus. If the number of tasks is less than the determined capacity, there is a shortage.

The request manager 114 can consider one or more goals in determining whether to retrieve a task from the new task queue 108 or the backlog task queue 110. The can include improving, in the context of a sales force in which the tasks are lead contacts and the resources are entities of a call center or sales force, a number of sales qualified opportunities (SQO), a call duration, total contacted calls, revenue, or labor reduction.

The task score circuitry 112 provides a score that is a prediction of SQO in some embodiments. The score changes based on time, and is thus sometimes called a dynamic lead score (DLS). The DLS provides insight into the best time to attempt to complete a task. The DLS of a lead, relative to DLS of other leads, indicates the best lead to call at a specified time (e.g., the lead with highest score). The global best lead to call at specified time can be assumed to be the one with highest DLS.

The task score circuitry 112 can predict a score for a number of times in the future (e.g., every hour for the next 24 hours), assuming all other data regarding the tasks remains static. The request manager 114 can analyze the predicted scores and choose tasks that maximize an accumulated score of tasks served, such as can be based on the determined capacity. For example, consider a first task that has a score of 95 at a first time and a score of 80 at a second, later time and a second task that has a score of 85 at the first time and a score of 40 at the second, later time. The request manager 114 can choose the second task at the first time and the first task at the second time, such as to maximize the total score of tasks served (in this example 85+80=165). This is compared to choosing the globally highest score and then serving the other task at the second time (for a total score of 95+40=135).

A naïve method for choosing, by the request manager 114, a task can include choosing the task with the highest score regardless of the queue in which the task resides. Consider a more formal mathematical representation of capacity and task processing. Let L be a computational length for capacity definition. If L=14, then the capacity is defined as total # of leads or hours that can be processed in the following 14 days. Let $\alpha$ be a capacity bound parameter for the resource 118. For example, if $\alpha$=0.5, the capacity, $c_i$, of the resource 118 is $0 \leq c_i \leq (1+\alpha)C_i$, where $C_i$ is the average capacity based on history data for the last L days and defined previously.

A less naïve solution can include determining a proportion of tasks in a backlog task queue 110 and new task queue 108 to resource capacity. The proportion can define a probability, p, for which a task is chosen from the backlog task queue 110. The probability that a task is chosen from the new task queue 108 is thus 1−p. In this scenario, $p=c_i/(1+\alpha)C_i$. To implement such a technique, a random number can be generated, looked up, hashed, or the like and mapped top or (1−p). The task can then be chosen from the queue corresponding to the mapping.

In the context of lead calling systems, a task is a lead, and one way to reduce a backlog is to send an email to the lead instead of using the resource 118 to call or otherwise attempt to contact the lead. Determining when and which tasks to handle by email is not trivial. Choosing to email leads with scores below a threshold ignores that the leads have time-dependent score can be a bad strategy. This is at least because a lead with a relatively low score at a first time can have the highest score at another time. Thus, simply emailing the lead with the lowest can be detrimental to an overall completion rate.

One solution to determining which lead to email, by the request manager 114, can include identifying a lead with a lowest average score for a specified period of time or identifying a lead with a lowest amount of time to expiry (as defined by a value in a task expiry field 214 (see FIG. 2)), a combination thereof (e.g., addition, multiplication, such as can be weighted, a combination thereof), or the like.

As previously discussed, decisions made by the request manager 114 can be based on a global perspective (capacity or backlog of all resources) or an individual view (capacity or backlog of an individual resource). The decision to email can similarly be determined from the global perspective or the individual view. On an individual level, the request manager 114 can determine the individual resource's capacity, compare to the backlog tasks assigned to that resource, and make a recommendation to email a specified number of the leads, or recommend which leads to email. Since an email is more efficient than calling in terms of number of tasks that can be completed, the individual and overall backlogs can be reduced by emails instead of calling. Such a technique, however, may not achieve a global optimum in terms of quality or quantity of leads contacted.

By making decisions based on the global perspective, the global optimum is more likely to be achieved. In a given time period, the number of new open leads and new closed leads can be tracked. The difference between new open leads and new closed leads indicates whether the number of leads are increasing or decreasing in the system. Closed leads can be differentiated in two different types: expired leads (as defined by value in task expiry field 214 (see FIG. 2)) and other closed leads (do not contact or sale successful).

More formally, let time at interval i be $t_i$, a traceback time interval be $\bar{t}$. Consider the period $T_i=[t_i-\bar{t}, t_i)$ to keep track of the performance of leads in the global resource pool. Given the definition of $T_i$, consider (1) $N_i^{expire}$: # of expired leads during $T_i$; (2) $N_i^{inPut}$: # of new open leads during $T_i$; (3): $N_i^{output}$ # of new closed leads during $T_i$ excluding expired leads (aka, effective closed leads); (4) $N_i^{excessive}$: # of excessive leads. It can be defined as $N_i^{input}-N_i^{output}$; (5) $N_i^{recommend}$: # of leads to be emailed; and (6) $N_i^{queue}$: # of leads in the system queues. The number of leads in the queues at interval i, is $N_i^{queue}=N_{i-1}^{queue}+N_i^{input}-N_i^{output}-N_i^{expire}-N_i^{recommend}$.

Ideally, $N_i^{expire}$ is zero. If $N_i^{input}=N_i^{output}+N_i^{expire}+N_i^{recommend}$, leads in the queues are consistent (not increasing or decreasing). If $N_i^{input}>N_i^{output}+N_i^{expire}+N_i^{recommend}$, leads in the queue are increasing. If $N_i^{input}<N_i^{output}+N_i^{expire}N_i^{recommend}$, leads in the queue are decreasing.

A number of emails to recommend can be based on whether the goal is to remain consistent or reduce a number of tasks in the backlog task queue 110. The number of emails to send can be based on a prediction of $N_i^{recommend}$ at time i, such as can be based on the historical data. At each time $t_i$, the request manager 114 can recommend leads for emailing based on the information of observation period (the past information until current time). Even on a global perspective of a number of leads to recommend for email communication, it can be advantageous to determine how many, and which, leads are to be emailed by the resource 118.

That is, historical data from an observation time period, $t_{i-1}$ through observation period $t_i$, can be used to predict how many emails to send to manage the backlog in a next time period, $t_{i+1}$.

A solution to the number of leads to email is dependent on a desired size of the backlog 110. The size can be adjusted based on the current number of tasks in the queue 110, ideal number of tasks in the backlog task queue 110, number of tasks in the queue 108, and determined capacity. For example, if the system is a cold start, a guess of the lead processing speed can be used as a basis and replaced with empirical data when there is sufficient empirical data.

In addition, or alternative, to the determined capacity, the request manager 114 can also consider an expiry of the tasks in the queues 108 and 110 in determining how many and which tasks to recommend for email. Leads that are determined to have an average score below a first threshold and have a time to expiry below a second threshold, an email can be recommended (e.g., regardless of any surplus considerations). In some embodiments, if the time to expiry is less than the second threshold, an email can be recommended independent of the score.

FIG. 2 illustrates, by way of example, a diagram of an embodiment of a task entry 200, such as can be stored in the new task queue 108 or the backlog task queue 110. The task entry 200 as illustrated includes a task name field 202, a task identification field 204, a resource identification field 206, a task score field 208, a new task field 210, a task details field 212, and a task expiry field 214. Not all fields are present in all entries. For example, a new task can be void of the resource identification field 206. In another example, a task entry can include only one of the resource identification field 206 and the new task field 210.

The task name field 202 identifies a name of a task, such as in embodiments where a task has a name. In some embodiments it can be sufficient to just identify the task by a unique identification, such as a value in the task identification field 204. The task name field 202 can detail a first name, last name, middle name, nickname, or the like, of a lead to be contacted in embodiments in which the tasks being routed are leads.

The task identification field 204 includes a value that uniquely identifies the task. The resource identification field 206 can include a value that uniquely identifies a resource assigned to the task associated with the task entry 200, or identifies that the task entry 200 is a new task. For example, if the value in the resource identification field 206 includes one or more specified values, the request manager 114 can determine that the associated task is a new task, and if the value in the resource identification field 206 is not the one or more specified values, then the resource identification field 206 identifies a backlog task that is assigned to a specified resource associated with the resource identification value in the resource identification field 206.

The task score field 208 is populated by the score circuitry 112. As previously discussed, the score in the score field 208 can be indicative of a quality of a lead at a specified time, such as in embodiments in which the tasks are leads. The new task field 210 indicates whether the task is a backlog task or a new task. For example, if a value in the new task field 210 is "1" or "0" the task entry 200 can correspond to a new task. If it is not a new task, the task entry 200 can be assumed, by the request manager 114, to correspond to a backlog task.

The task details field 212 can include data of details of the task to be completed. The task details field 212 can identify a project to which the task is associated, a history of attempts to complete the task, a goal associated with the task that when satisfied indicates the task is complete, or the like. The task expiry field 214 can include a date or time at which the task is no longer viable. The task expiry field 214 can be set to be a specified time from a time a resource last attempted to complete the task, a time the task was received at the router 102, new task queue 108, or backlog task queue 110, or the like.

Figure 3:
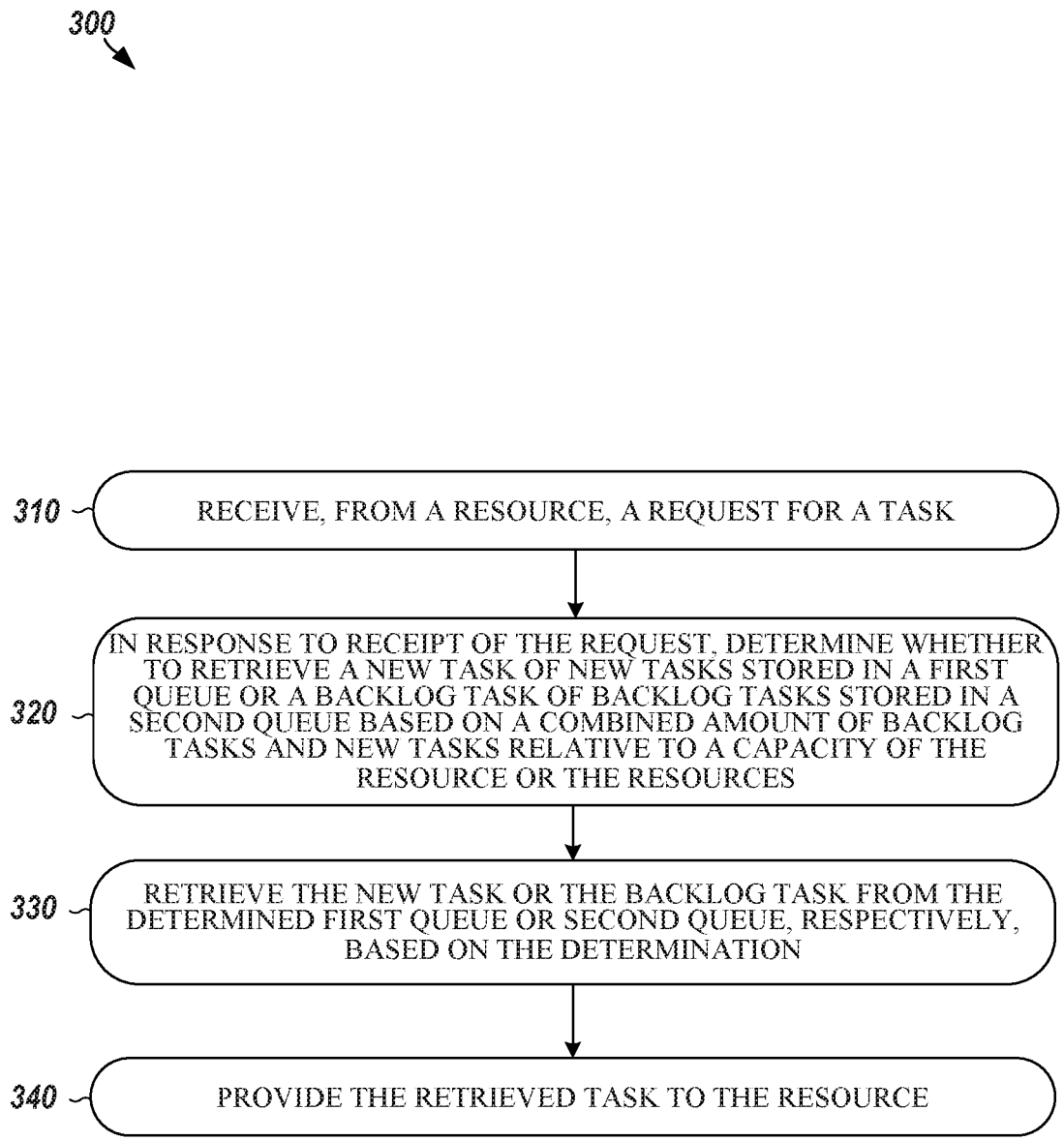
FIG. 3 illustrates, by way of example, a diagram of an embodiment of a method for task management.

FIG. 3 illustrates, by way of example, a diagram of an embodiment of a method 300 for task management. The method 300 can be performed by one or more components of the system 100, such as can be implemented using processing circuitry. The method 300 as illustrated includes receiving, from a resource, a request for a task, at operation 310; in response to receiving the request, determining whether to retrieve a new task of new tasks stored in a first queue or a backlog task of backlog tasks stored in a second queue based on a combined amount of backlog tasks and new tasks relative to a capacity of the resource or the resources, at operation 320; retrieving the new task or the backlog task from the determined first queue or second queue, respectively, based on the determination, at operation 330; and providing the retrieved task to the resource, at operation 340.

The method 300 can further include, wherein each of the new tasks and the backlog tasks includes an associated score that indicates a likelihood of the resource completing the task relative to other tasks of the new tasks and the backlog tasks. The method 30o can further include, wherein retrieval of the determined task includes identification of a task with a highest associated score in the determined first queue or second queue. The method 300 can further include receiving data from the resource indicating whether the resource was able to successfully complete the provided task. The method 300 can further include, in response to the received data indicating that the resource was not able to successfully complete the provided task, storing the retrieved task in the second queue with data detailing circumstances of the unsuccessful attempt to complete the provided task.

The method 300 can further include, wherein the data detailing circumstances of the unsuccessful attempt to complete the provided task include a resource identification uniquely identifying the resource of the resources. The method 300 can further include retrieving the backlog task and wherein the backlog task includes a resource identification field with a value that matches the resource identification of the resource. The method 300 can further include, wherein the capacity is a global capacity of all resources and the amount of backlog tasks is a global amount of backlog tasks for all the resources, and the operations further include determining the global capacity based on fourteen or more days of historical data regarding an amount of tasks that can be completed by all the resources.

The method 300 can further include, wherein the capacity is an individual capacity of the resource and the amount of backlog tasks is an amount of backlog tasks of the backlog tasks that includes an associated resource identification that matches a resource identification of the resource, and the method further includes determining the individual capacity based on fourteen or more days of historical data regarding an amount of tasks that can be completed by only the resource. The method 300 can further include estimating, based on historical data, an amount of the new tasks and the backlog tasks that will remain uncompleted. The method 300 can further include indicating to each resource of the resources a number of backlog tasks of the backlog tasks that include an associated resource identification equal to a resource identification of the resource to complete by alternative means. The method 300 can further include, wherein each of the new tasks and the backlog tasks includes respective scores for respective times that indicate a likelihood of the resource completing the task relative at the respective time and relative to other tasks of the new tasks and the backlog tasks. The method 300 can further include, wherein retrieval of the determined task includes identification of tasks that maximize an accumulated score of tasks completed over a plurality of the respective times and retrieving the tasks that maximize the score.

Figure 4:
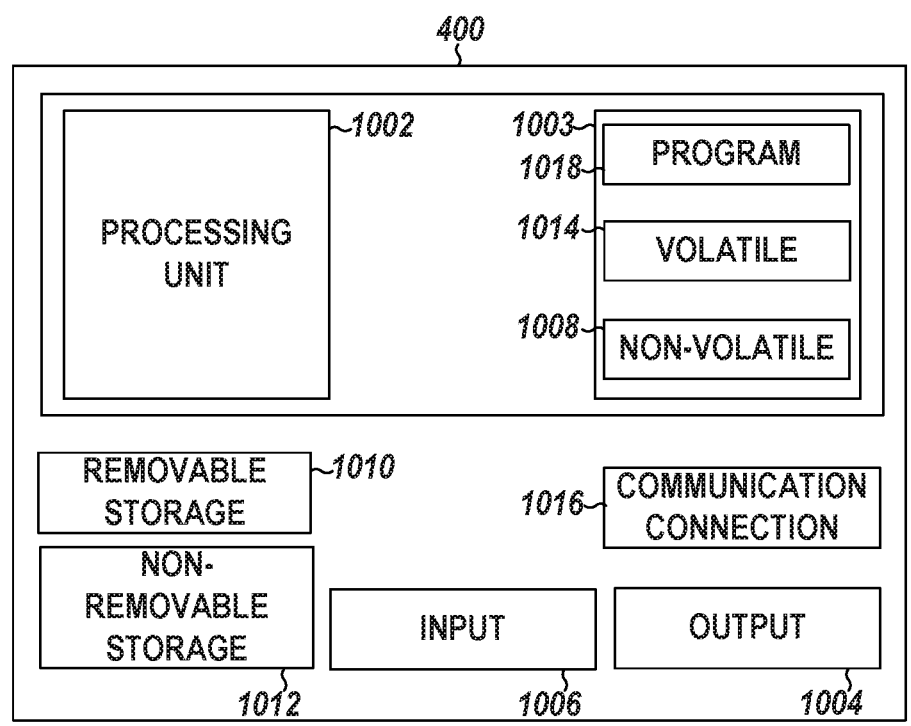
FIG. 4 illustrates, by way of example, a block diagram of an embodiment of a machine (e.g., a computer system) to implement one or more embodiments.

FIG. 4 illustrates, by way of example, a block diagram of an embodiment of a machine 400 (e.g., a computer system) to implement one or more embodiments. One example machine 400 (in the form of a computer), may include a processing unit 1002, memory 1003, removable storage 1010, and non-removable storage 1012. Although the example computing device is illustrated and described as machine 400, the computing device may be in different forms in different embodiments. For example, the computing device may instead be a smartphone, a tablet, smartwatch, or other computing device including the same or similar elements as illustrated and described regarding FIG. 4. Devices such as smartphones, tablets, and smartwatches are generally collectively referred to as mobile devices. Further, although the various data storage elements are illustrated as part of the machine 400, the storage may also or alternatively include cloud-based storage accessible via a network, such as the Internet.

Memory 1003 may include volatile memory 1014 and non-volatile memory 1008. The machine 400 may include— or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 400 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 400, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 400. A hard drive, CD-ROM, and RAM are some examples of articles including a non-transitory computer-readable medium such as a storage device. For example, a computer program 1018 may be used to cause processing unit 1002 to perform one or more methods or algorithms described herein.

ADDITIONAL NOTES AND EXAMPLES

Example 1 includes a task management system comprising a first queue to store new tasks for completion by a resource of resources, a second queue to store backlog tasks previously attempted, unsuccessfully, by the resource of the resources, processing circuitry coupled to the first and second queues, the processing circuitry to receive, from the resource, a request for a task, in response to receiving the request, determine whether to retrieve a new task of the new tasks or a backlog task of the backlog tasks based on a combined amount of backlog tasks and new tasks relative to a capacity of the resource or the resources, retrieve the new task or the backlog task from the determined first queue or second queue, respectively, based on the determination, and provide the retrieved task to the resource.

In Example 2, Example 1 can further include, wherein each of the new tasks and the backlog tasks includes an associated score that indicates a likelihood of the resource completing the task relative to other tasks of the new tasks and the backlog tasks, and retrieval of the determined task includes identification of a task with a highest associated score in the determined first queue or second queue.

In Example 3, at least one of Examples 1-2 can further include, wherein the processing circuitry is further to receive data from the resource indicating whether the resource was able to successfully complete the provided task, and in response to the received data indicating that the resource was not able to successfully complete the provided task, store the retrieved task in the second queue with data detailing circumstances of the unsuccessful attempt to complete the provided task.

In Example 4, Example 3 can further include, wherein the data detailing circumstances of the unsuccessful attempt to complete the provided task include a resource identification uniquely identifying the resource of the resources.

In Example 5, Example 4 can further include, wherein the processing circuitry is to retrieve the backlog task and wherein the backlog task includes a resource identification field with a value that matches the resource identification of the resource.

In Example 6, at least one of Examples 1-5 can further include, wherein the capacity is a global capacity of all resources and the amount of backlog tasks is a global amount of backlog tasks for all the resources, and processing circuitry is further to determine the global capacity based on fourteen or more days of historical data regarding an amount of tasks that can be completed by all the resources.

In Example 7, at least one of Examples 1-6 can further include, wherein the capacity is an individual capacity of the resource and the amount of backlog tasks is an amount of backlog tasks of the backlog tasks that includes an associated resource identification that matches a resource identification of the resource, and the processing circuitry is further to determine the individual capacity based on fourteen or more days of historical data regarding an amount of tasks that can be completed by only the resource.

In Example 8, at least one of Examples 1-7 can further include, wherein the processing circuitry is further to estimate, based on historical data, an amount of the new tasks and the backlog tasks that will remain uncompleted, and indicate to each resource of the resources a number of backlog tasks of the backlog tasks that include an associated resource identification equal to a resource identification of the resource to complete by alternative means.

In Example 9, at least one of Examples 1-8 can further include, wherein each of the new tasks and the backlog tasks includes respective scores for respective times that indicate a likelihood of the resource completing the task relative at the respective time and relative to other tasks of the new tasks and the backlog tasks, and retrieval of the determined task includes identification of tasks that maximize an accumulated score of tasks completed over a plurality of the respective times and retrieving the tasks that maximize the score.

Example 10 includes a non-transitory machine-readable medium including instructions that, when executed by a machine, configure the machine to perform operations comprising receiving, from a resource, a request for a task, in response to receiving the request, determining whether to retrieve a new task of new tasks stored in a first queue or a backlog task of backlog tasks stored in a second queue based on a combined amount of backlog tasks and new tasks relative to a capacity of the resource or the resources, retrieving the new task or the backlog task from the determined first queue or second queue, respectively, based on the determination, and providing the retrieved task to the resource.

In Example 11, Example 10 can further include, wherein each of the new tasks and the backlog tasks includes an associated score that indicates a likelihood of the resource completing the task relative to other tasks of the new tasks and the backlog tasks, and retrieval of the determined task includes identification of a task with a highest associated score in the determined first queue or second queue.

In Example 12, at least one of Examples 10-11 can further include, wherein the operations further include receiving data from the resource indicating whether the resource was able to successfully complete the provided task, and in response to the received data indicating that the resource was not able to successfully complete the provided task, storing the retrieved task in the second queue with data detailing circumstances of the unsuccessful attempt to complete the provided task.

In Example 13, Example 12 can further include, wherein the data detailing circumstances of the unsuccessful attempt to complete the provided task include a resource identification uniquely identifying the resource of the resources.

In Example 14, Example 1-3 can further include, wherein the operations further include retrieving the backlog task and wherein the backlog task includes a resource identification field with a value that matches the resource identification of the resource.

In Example 15, at least one of Examples 10-14 can further include, wherein the capacity is a global capacity of all resources and the amount of backlog tasks is a global amount of backlog tasks for all the resources, and the operations further include determining the global capacity based on fourteen or more days of historical data regarding an amount of tasks that can be completed by all the resources.

Example 16 includes a method of task management comprising receiving, from a resource, a request for a task, in response to receiving the request, determining whether to retrieve a new task of new tasks stored in a first queue or a backlog task of backlog tasks stored in a second queue based on a combined amount of backlog tasks and new tasks relative to a capacity of the resource or the resources, retrieving the new task or the backlog task from the determined first queue or second queue, respectively, based on the determination, and providing the retrieved task to the resource.

In Example 17, Example 16 further includes, wherein the capacity is an individual capacity of the resource and the amount of backlog tasks is an amount of backlog tasks of the backlog tasks that includes an associated resource identification that matches a resource identification of the resource, and the method further includes determining the individual capacity based on fourteen or more days of historical data regarding an amount of tasks that can be completed by only the resource.

In Example 18, at least one of Examples 16-17 can further include estimating, based on historical data, an amount of the new tasks and the backlog tasks that will remain uncompleted, and indicating to each resource of the resources a number of backlog tasks of the backlog tasks that include an associated resource identification equal to a resource identification of the resource to complete by alternative means.

In Example 19, at least one of Examples 16-18 can further include, wherein each of the new tasks and the backlog tasks includes respective scores for respective times that indicate a likelihood of the resource completing the task relative at the respective time and relative to other tasks of the new tasks and the backlog tasks, and retrieval of the determined task includes identification of tasks that maximize an accumulated score of tasks completed over a plurality of the respective times and retrieving the tasks that maximize the score.

In Example 20, at least one of Examples 16-19 can further include, wherein each of the new tasks and the backlog tasks includes an associated score that indicates a likelihood of the resource completing the task relative to other tasks of the new tasks and the backlog tasks, and retrieval of the determined task includes one of (i) identification of a task with a highest associated score in the determined first queue or second queue, and (ii) retrieval of the determined task includes identification of tasks that maximize an accumulated score of tasks completed over a plurality of the respective times and retrieving the tasks that maximize the score.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A task management system comprising:
 a first queue to store new tasks for completion by a resource of resources;
 a second queue to store backlog tasks previously attempted, unsuccessfully, by the resource of the resources;
 processing circuitry coupled to the first and second queues, the processing circuitry to:
 receive, from the resource, a request for a task;
 in response to receiving the request, determine whether to retrieve a new task of the new tasks or a backlog task of the backlog tasks based on a combined amount of backlog tasks and new tasks relative to a capacity of the resource or the resources;
 retrieve the new task or the backlog task from the determined first queue or second queue, respectively, based on the determination; and
 provide the retrieved task to the resource.

2. The system of claim 1, wherein:
 each of the new tasks and the backlog tasks includes an associated score that indicates a likelihood of the resource completing the task relative to other tasks of the new tasks and the backlog tasks; and
 retrieval of the determined task includes identification of a task with a highest associated score in the determined first queue or second queue.

3. The system of claim 1, wherein the processing circuitry is further to:
 receive data from the resource indicating whether the resource was able to successfully complete the provided task; and
 in response to the received data indicating that the resource was not able to successfully complete the provided task, store the retrieved task in the second queue with data detailing circumstances of the unsuccessful attempt to complete the provided task.

4. The system of claim 3, wherein the data detailing circumstances of the unsuccessful attempt to complete the provided task include a resource identification uniquely identifying the resource of the resources.

5. The system of claim 4, wherein the processing circuitry is to retrieve the backlog task and wherein the backlog task includes a resource identification field with a value that matches the resource identification of the resource.

6. The system of claim 1, wherein the capacity is a global capacity of all resources and the amount of backlog tasks is a global amount of backlog tasks for all the resources, and processing circuitry is further to:
 determine the global capacity based on fourteen or more days of historical data regarding an amount of tasks that can be completed by all the resources.

7. The system of claim 1, wherein the capacity is an individual capacity of the resource and the amount of backlog tasks is an amount of backlog tasks of the backlog tasks that includes an associated resource identification that matches a resource identification of the resource, and processing circuitry is further to:
 determine the individual capacity based on fourteen or more days of historical data regarding an amount of tasks that can be completed by only the resource.

8. The system of claim 1, wherein the processing circuitry is further to:
 estimate, based on historical data, an amount of the new tasks and the backlog tasks that will remain uncompleted; and
 indicate to each resource of the resources a number of backlog tasks of the backlog tasks that include an associated resource identification equal to a resource identification of the resource to complete by alternative means.

9. The system of claim 1, wherein:
 each of the new tasks and the backlog tasks includes respective scores for respective times that indicate a likelihood of the resource completing the task relative at the respective time and relative to other tasks of the new tasks and the backlog tasks; and
 retrieval of the determined task includes identification of tasks that maximize an accumulated score of tasks completed over a plurality of the respective times and retrieving the tasks that maximize the score.

10. A non-transitory machine-readable medium including instructions that, when executed by a machine, configure the machine to perform operations comprising:
 receiving, from a resource, a request for a task;
 in response to receiving the request, determining whether to retrieve a new task of new tasks stored in a first queue or a backlog task of backlog tasks stored in a second queue based on a combined amount of backlog tasks and new tasks relative to a capacity of the resource or the resources;
 retrieving the new task or the backlog task from the determined first queue or second queue, respectively, based on the determination; and
 providing the retrieved task to the resource.

11. The non-transitory machine-readable medium of claim 10, wherein:
 each of the new tasks and the backlog tasks includes an associated score that indicates a likelihood of the resource completing the task relative to other tasks of the new tasks and the backlog tasks; and
 retrieval of the determined task includes identification of a task with a highest associated score in the determined first queue or second queue.

12. The non-transitory machine-readable medium of claim 10, wherein the operations further include:
 receiving data from the resource indicating whether the resource was able to successfully complete the provided task; and
 in response to the received data indicating that the resource was not able to successfully complete the provided task, storing the retrieved task in the second queue with data detailing circumstances of the unsuccessful attempt to complete the provided task.

13. The non-transitory machine-readable medium of claim 12, wherein the data detailing circumstances of the unsuccessful attempt to complete the provided task include a resource identification uniquely identifying the resource of the resources.

14. The non-transitory machine-readable medium of claim 13, wherein the operations further include retrieving the backlog task and wherein the backlog task includes a resource identification field with a value that matches the resource identification of the resource.

15. The non-transitory machine-readable medium of claim 10, wherein the capacity is a global capacity of all resources and the amount of backlog tasks is a global amount of backlog tasks for all the resources, and the operations further include:
   determining the global capacity based on fourteen or more days of historical data regarding an amount of tasks that can be completed by all the resources.

16. A method of task management comprising:
   receiving, from a resource, a request for a task;
   in response to receiving the request, determining whether to retrieve a new task of new tasks stored in a first queue or a backlog task of backlog tasks stored in a second queue based on a combined amount of backlog tasks and new tasks relative to a capacity of the resource or the resources;
   retrieving the new task or the backlog task from the determined first queue or second queue, respectively, based on the determination; and
   providing the retrieved task to the resource.

17. The method of claim 16, wherein the capacity is an individual capacity of the resource and the amount of backlog tasks is an amount of backlog tasks of the backlog tasks that includes an associated resource identification that matches a resource identification of the resource, and the method further includes:
   determining the individual capacity based on fourteen or more days of historical data regarding an amount of tasks that can be completed by only the resource.

18. The method of claim 16, further comprising:
   estimating, based on historical data, an amount of the new tasks and the backlog tasks that will remain uncompleted; and
   indicating to each resource of the resources a number of backlog tasks of the backlog tasks that include an associated resource identification equal to a resource identification of the resource to complete by alternative means.

19. The method of claim 16, wherein:
   each of the new tasks and the backlog tasks includes respective scores for respective times that indicate a likelihood of the resource completing the task relative at the respective time and relative to other tasks of the new tasks and the backlog tasks; and
   retrieval of the determined task includes identification of tasks that maximize an accumulated score of tasks completed over a plurality of the respective times and retrieving the tasks that maximize the score.

20. The method of claim 16, further comprising:
   each of the new tasks and the backlog tasks includes an associated score that indicates a likelihood of the resource completing the task relative to other tasks of the new tasks and the backlog tasks; and
   retrieval of the determined task includes one of (i) identification of a task with a highest associated score in the determined first queue or second queue, and (ii) retrieval of the determined task includes identification of tasks that maximize an accumulated score of tasks completed over a plurality of the respective times and retrieving the tasks that maximize the score.

* * * * *